United States Patent [19]
Benson

[11] 3,863,510
[45] Feb. 4, 1975

[54] INERTIA ENGINE
[76] Inventor: Everett H. Benson, Rt. 1, Box 429, Eagle Creek, Oreg. 97022
[22] Filed: Jan. 16, 1974
[21] Appl. No.: 433,933

[52] U.S. Cl. ................. 74/64, 180/1 R, 60/69.8, 184/4, 74/751
[51] Int. Cl. ........................................... F16h 33/12
[58] Field of Search .......... 74/64, 572, 751; 73/514, 73/71; 123/117, 116; 137/38; 60/698; 185/4, 27

[56] References Cited
UNITED STATES PATENTS

| | | | |
|---|---|---|---|
| 995,037 | 6/1911 | Smyth | 185/4 |
| 2,301,943 | 11/1942 | Georg | 74/572 |
| 2,645,130 | 7/1953 | Chamberlain et al. | 74/64 |
| 2,894,417 | 7/1959 | Boling | 74/751 |
| 3,581,584 | 6/1971 | Williams | 74/64 |

FOREIGN PATENTS OR APPLICATIONS

| | | | |
|---|---|---|---|
| 875,118 | 4/1953 | Germany | 60/698 |
| 1,227,981 | 3/1960 | France | 74/64 |
| 329,165 | 5/1930 | Great Britain | 74/64 |

*Primary Examiner*—Wesley S. Ratliff, Jr.
*Attorney, Agent, or Firm*—Klarquist, Sparkman, Campbell, Leigh, Hall & Whinston

[57] ABSTRACT

An inertia engine includes a motor driven drive shaft supporting a coaxially mounted piston rod which is rotatable with and movable axially along the drive shaft. A pair of balanced weights are also mounted for rotation with said drive shaft on a pair of gear segments engaged by racks mounted on the piston rod such that axial movement of the piston rod draws the weights inwardly toward the drive shaft in an arcuate manner, i.e., having a component of motion in a direction parallel to the axis of the drive shaft. The piston rod is then released, whereby the weights are moved outwardly by centrifugal force, in an arcuate path having a component in an axial direction. A component of thrust is thereby produced for causing motion of the vehicle upon which the inertia engine is mounted.

7 Claims, 6 Drawing Figures

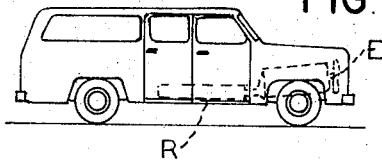
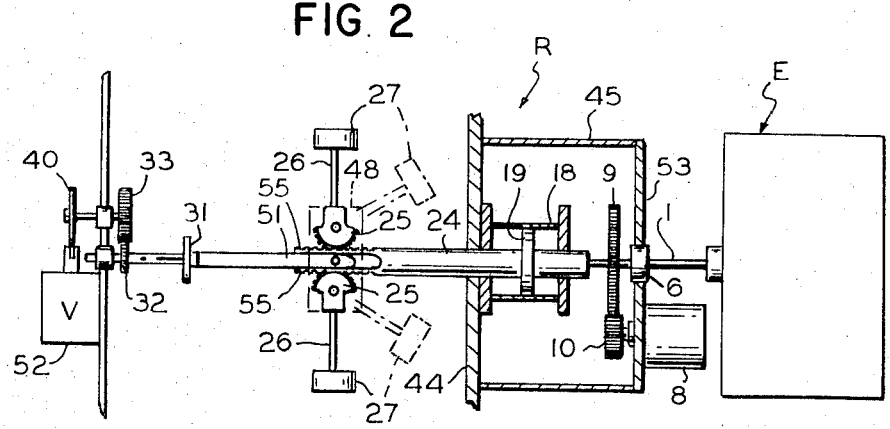
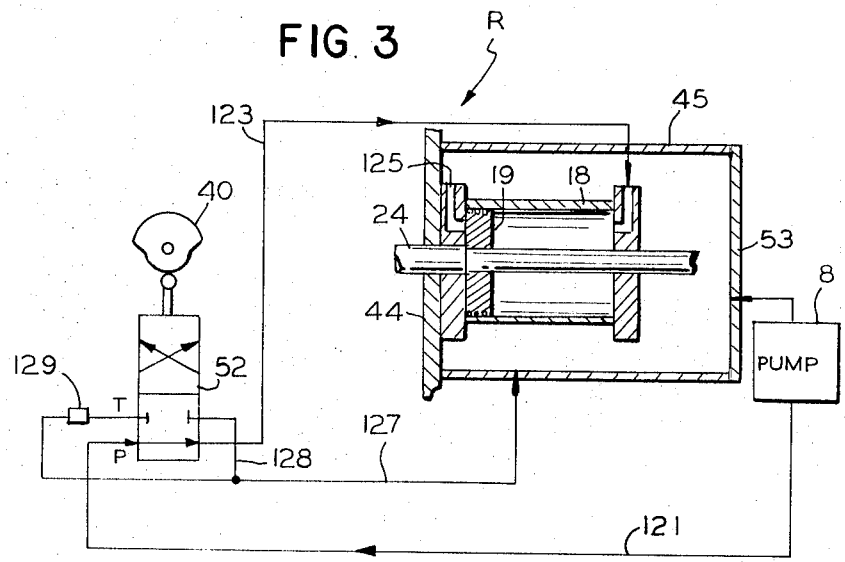

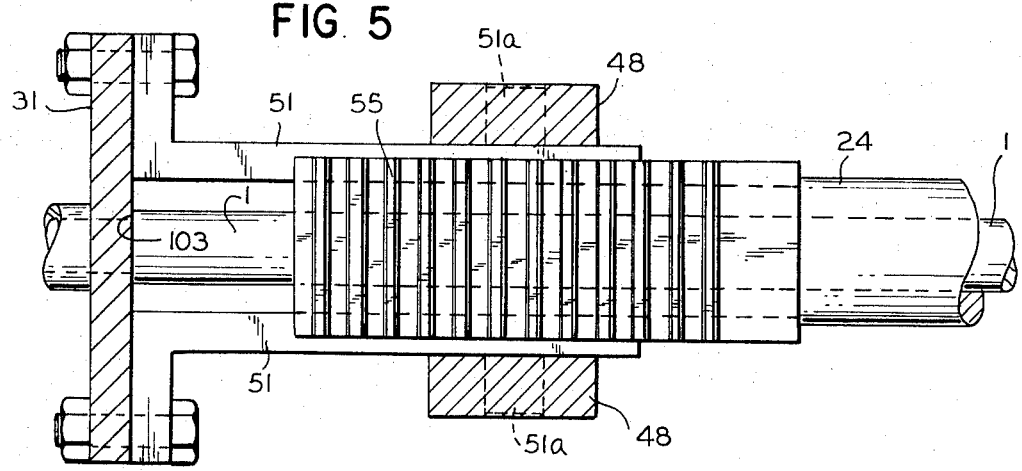
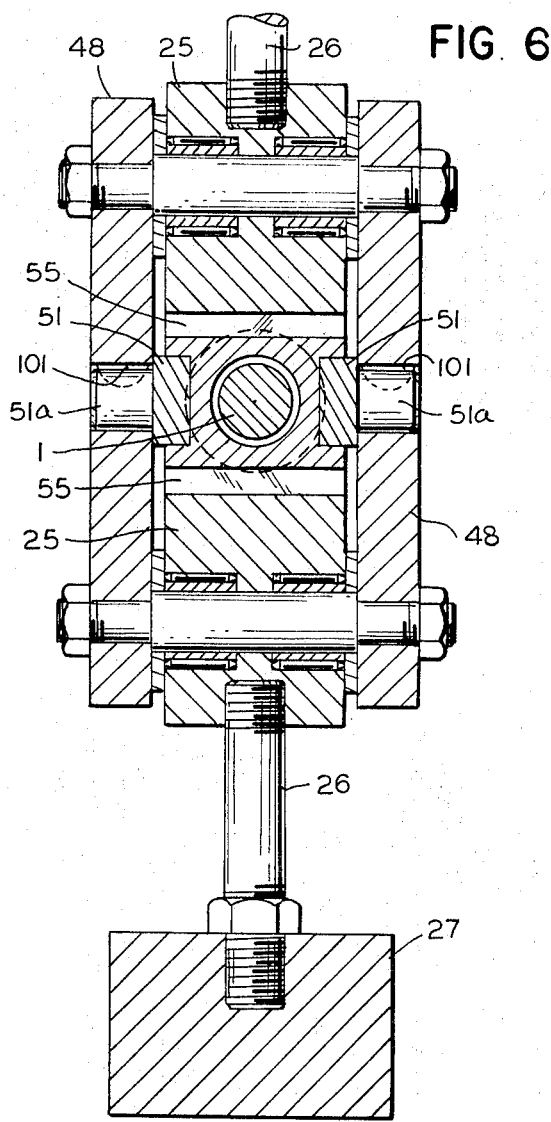

INERTIA ENGINE

BACKGROUND OF THE INVENTION

The present invention relates to an inertia engine and particularly to such an engine adapted for driving a land vehicle such as an automobile.

Conventional drive for land vehicles almost always involves application of rotational force to one or a plurality of the vehicle's wheels. The propulsion thus produced is dependent upon traction between the vehicle wheel and the surface over which the vehicle travels, and is subject to either lack of traction experienced by the plurality of driven wheels, or experienced by one of a pair of driven wheels interconnected by a differential mechanism. Thus, the inertia of the vehicle inhibits movement thereof on slippery surfaces, or across the surface of snow, sand mud or the like.

As inertial engine avoids these difficulties and also avoids the expense of transmission of power to the traction wheels and the frictional wear brought about by traction itself. Inertial devices have been heretofore proposed, but have been complicated or unbalanced, presenting mechanical driving difficulties to the prime mover, bearings, etc.

SUMMARY OF THE INVENTION

In accordance with an embodiment of the present invention, an inertia engine comprises a reaction mechanism adapted to be driven by a vehicle-mounted prime mover. The reaction mechanism includes a drive shaft which is driven by the prime mover, and a mass which desirably comprises a pair of balanced weights mounted for rotation with the drive shaft. Actuating means draw the weights radially inwardly toward the axis of the drive shaft in a direction of movement having a component parallel to the axis of the drive shaft. The weights are then released from this position for executing a reverse motion in response to centrifugal force, and including a component of movement parallel to the axis of the shaft for producing thrust in a direction along the shaft. This axial thrust produces movement of the vehicle mounting the reaction mechanism.

According to a particular embodiment of the present invention, the weights are attached to gear segments supported by a gear box mounted upon a pair of keys. The pair of keys rotate with the drive shaft and slidably receive a piston rod mounted coaxially with the shaft and carrying racks for engaging the aforementioned gear segments. A piston operating the piston rod moves the same along the drive shaft, causing the drive shaft mounted racks to rotate the gear segments and draw the weights inwardly. Later, the piston is released and the weights move outwardly in the manner described above. The cycle is, of course, repeated as the prime mover continues to rotate the drive shaft.

Therefore, an object of the present invention is to provide an improved engine which requires no driven traction device for engaging the surface over which a driven vehicle is to move.

It is another object of the present invention to provide an improved inertia engine which is substantially rotationally balanced.

It is a further object of the present invention to provide an inertia engine which employs an efficacious and simplified drive mechanism.

The subject matter which I regard as my invention is particularly pointed out and distinctly claimed in the concluding portion of this specification. The invention, however, both as to organization and method of operation, together with further advantages and objects thereof, may best be understood by reference to the following description taken in connection with the accompanying drawings wherein like reference characters refer to like elements.

DRAWINGS

FIG. 1 is a view of an automotive vehicle incorporating the inertia engine of the invention;

FIG. 2 is a schematic diagram of the inertia engine;

FIG. 3 is a hydraulic circuit forming part of the engine;

FIG. 5 is a fragmentary sectional view taken along lines 5—5 of FIG. 4; and

FIG. 6 is a cross section taken along line 6—6 of FIG. 4.

DETAILED DESCRIPTION

Figure 4:
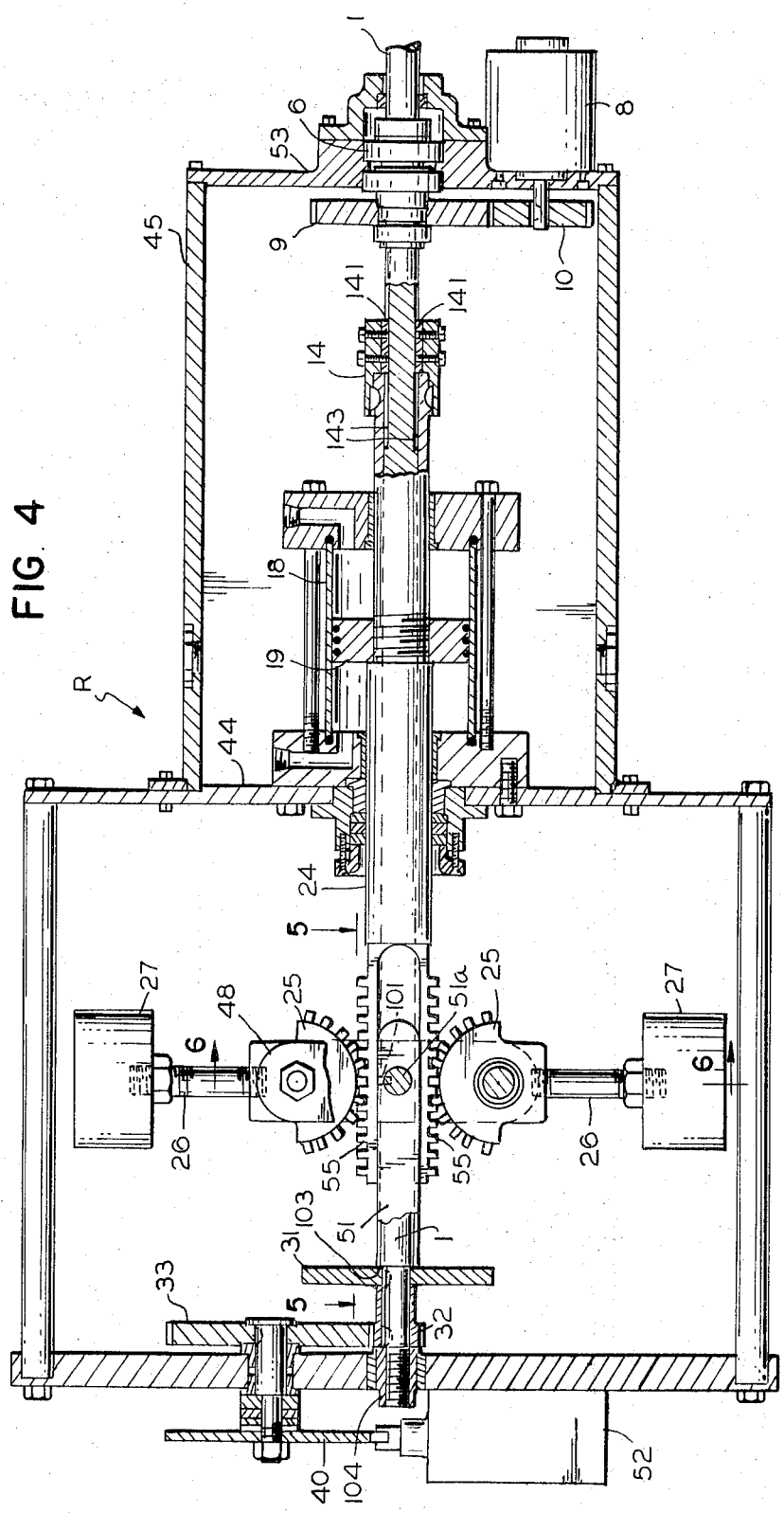
FIG. 4 is a longitudinal cross section through the reaction mechanism, conforming generally to the FIG. 2 arrangement.

Referring to FIG. 1, the inertia engine comprises a reaction mechanism R which is driven by a standard prime mover such as an engine E. Referring to FIGS. 2 through 6, the engine is drivingly connected to a main shaft 1, which extends uninterruptedly through the entire mechanism and does not vary in size except at its right hand end, where it is mounted by bearings 6 in the cylinder head 53 of the reservoir 45, and except at its left hand end where it is provided with a shoulder for thrust purposes to be described.

The main drive shaft, through various gear trains and other connections, drives (1) fluid pressure pump 8; (2) a rotatable mass in the form of inertia weights 27; and (3) the four way control valve 52.

The inertia weights tend to maintain a plane of rotation with their mounting rods 26 radially disposed and normal to the axis of the main shaft 1. However, they can be moved out of such plane by means of the piston 19 operating in the cylinder 18 through the means of a linkage including a tubular piston rod 24 through which a shaft 1 rotatably extends. The piston rod has rack teeth 55 located thereon for meshing with spur gear segments 25 which are pivotally mounted on pins in a gear box 48. The weights 27 have rods 26 fastened to the outer ends of the gear segments 25.

The gear box is prevented from assuming an askew position relative to the shaft 1 (i.e., it is always maintained at 90° to the axis of shaft 1) by a pair of keys 51 which slidably fit in the rack portion of the piston rod and have outwardly extending bosses 51a (FIGS. 4, 5 and 6) fitting in bores in the gear box and held against turning movement by the means of Woodruff keys 101. The keys 51 are bolted to a pressure plate 31 which bears against a shoulder 103 formed on the shaft 1. The pressure plate is keyed to the shaft, and is held against the shoulder 103 by a collar on a gear 32 and by a nut 104 threaded on the left hand end of the main shaft 1. The pressure plate and its keys 51 and the bosses 51a retain the box 48 in fixed relation to shaft 1.

The main shaft 1 drives the pump 8 through spur gears 9 and 10, and drives a cam 40 for valve 52 by means of spur gears 32 and 33. The cam 40 engages a follower on the four way valve 52 which is mounted on the frame of the machine.

The gears 32 and 33 have a 4 to 1 ratio so that the valve is operated starting every four revolutions of the main shaft.

The right hand end of the piston rod 24 is drivingly connected by a drive coupling 14 to the shaft 1. The drive coupling 14 has keys 141 which fit in keyways 143 formed in the shaft 1 to allow for movement of the piston rod relative to the shaft under the influence of the piston 19. By having a driving connection from the shaft 1 at the coupling 14 as well as at the pressure plate 31, the torsional stress on the shaft is minimized.

Referring particularly to FIG. 3, valve 52 is "normally" positioned to connect the right end of cylinder 18 to hydraulic pump 8, while the left end of cylinder 18 is coupled to reservoir 45 via port 125. The reservoir 45 is mounted on rear cylinder bearing carrier plate 44 which forms part of the frame of the machine. When cam 40 turns such that the lobe thereof urges the spool of valve 52 downwardly as viewed in FIG. 3, the right hand end of cylinder 18 will be coupled to the reservoir by way of restriction 129, while the pump 8 will be returned to the reservoir.

OPERATION

At start up, assume that the valve 52 is in its FIG. 3 position for urging weights 27 to the position illustrated by dashed lines in FIG. 2. With the valve in the position shown in FIG. 3, hydraulic pressure will be supplied from the pump 8 through a line 121 to and through the valve 52 to a line 123 which is connected to the right hand end of the cylinder 18, forcing the piston 19 to move to the left thereby forcing the piston rod 24 and its rack teeth 55 to the left to turn the segment gears 25. This moves the weights 27 inwardly from their normal plane of rotation. Fluid from the left hand end of the cylinder at this time goes through a port 125 to the reservoir 45.

The piston 19 will reach the end of its travel in less than two revolutions of the shaft 1, where it waits for the valve 52 to be tripped. When the lobe on the cam 40 does engage the follower on the valve, it is tripped and the spool of the valve is shifted downwardly to place the right hand end of the cylinder in communication with the reservoir 45 through valve 52 and a restriction 129. Also the pump 8 is placed in communication with the reservoir through line 121, valve 52 and lines 127–128.

When the fluid pressure is released behind the piston 19 the weights 27 which are applying a considerable force to the piston rod urging it to the right, now force the piston to the right as fluid is forced through the restriction 129.

As the weights 27 move back to their outward position by forcing fluid past the restriction 129, their reactive force urges the vehicle to the right, said force being transmitted from the weights through the segment gears 25, the box 48, through the keys 51 to the pressure plate 31, from the pressure plate through the shoulder 103 to the shaft 1, and lengthwise along the shaft to the bearings 6 to the frame of the machine. Centrifugal force urges the weights 27 outwardly, and in moving outwardly the weights are constrained by the axes of gear segments 25 also to move in an axial direction, i.e., in an arcuate path having an axial component, for producing an axial thrust which drives the vehicle in which the engine and reaction mechanism are located. The weights 27 move outwardly more rapidly than they were moved inwardly by the hydraulic pump pressure behind piston 19. Of course, the cycle of operations described above repeats as the drive shaft is rotated by the prime mover. A pair of weights 27 are advantageous for ease of position control in the present structure. However, a larger number of weights may alternatively be employed. The weights should also preferably balance one another for avoiding radial vibration.

While I have shown and described a preferred embodiment of my invention, it will be apparent to those skilled in the art that many changes and modifications may be made without departing from my invention in its broader aspects. I, therefore, intend the appended claims to cover all such changes and modifications as fall within the true spirit and scope of my invention.

I claim:

1. An inertia engine comprising a reaction mechanism adapted to be driven by a vehicle-mounted prime mover, the reaction mechanism including:

a rotatable drive shaft, a mass and means attaching said mass to said drive shaft for rotation with said drive shaft, and means for moving said mass inwardly toward said drive shaft and for partially releasing said mass for movement outwardly away from said drive shaft in a direction having a component axial of said drive shaft for providing thrust in the last mentioned direction, said mass moving outwardly in response to centrifugal force as said mass is rotated by said drive shaft.

2. The apparatus according to claim 1 wherein the means for moving said mass inwardly toward said drive shaft includes a piston rod coaxially mounted with said drive shaft, a piston for moving said rod, and linkage means interconnecting said piston rod and said mass for producing rotation thereof in a direction substantially perpendicular to the axial direction of said drive shaft.

3. An inertia engine comprising a reaction mechanism adapted to be driven by a vehicle-mounted prime mover, the reaction mechanism including:

a drive shaft having a driven connection with said prime mover, at least a pair of balanced weights mounted for rotation with said drive shaft and affected by centrifugal force such that the weights are urged outwardly by such force as the drive shaft is rotated by said prime mover, actuating means for drawing said weights radially inwardly toward the axis of said drive shaft during a first portion of the operating cycle of the reaction mechanism in a direction of movement having a component parallel to the axis of said drive shaft, and means for releasing said weights for execution of the reverse motion in response to centrifugal force in a direction radially outwardly and having a component of movement parallel to the axis of said shaft in a direction reverse from said first mentioned component for producing a thrust in a direction along said drive shaft.

4. Apparatus according to claim 3 wherein said drive shaft is axially superimposed with a piston rod provided with rack teeth, said apparatus including gear segments for supporting said weights and meshing with said rack teeth, said actuating means for drawing said weights radially inwardly comprising a piston for urging said piston rod along said shaft causing said rack teeth to rotate said gear segments in a direction moving said weights in an arc with respect to said drive shaft.

5. The apparatus according to claim 4 including a pair of keys which rotate with said drive shaft for slidably engaging said piston rod on the opposite side of said gear segments from said piston, and a gear box secured to said keys for providing the axial support for said gear segments.

6. The appparatus according to claim 4 further including a valve operated in response to predetermined rotational positions of said drive shaft and coupled for moving said piston in a direction drawing said weights inwardly, said valve providing the said means for releasing said weights through valving said piston such that the piston is allowed to move in the axially reversed direction whereby said weights are forced radially outwardly by centrifugal force.

7. The apparatus according to claim 6 further including a hydraulic pump having a driven connection with said drive shaft and a fluid connection with said valve for providing hydraulic force for operating said piston.

* * * * *